United States Patent [19]
Nehring

[11] Patent Number: 5,413,850
[45] Date of Patent: May 9, 1995

[54] NON-CONDUCTIVE ALUMINUM OXIDE-TITANIUM CARBIDE (A1203-TIC) THIN FILM COMPUTER HEAD SUBSTRATE, METHOD OF MAKING SAME, AND SLIDER ELEMENT INCORPORATING SAME

[75] Inventor: Vincent W. Nehring, Stillwater, Minn.

[73] Assignee: Minnesota Mining and Manufacturing Company, St. Paul, Minn.

[21] Appl. No.: 52,956

[22] Filed: Apr. 23, 1993

Related U.S. Application Data

[63] Continuation of Ser. No. 783,835, Oct. 29, 1991, abandoned.

[51] Int. Cl.$^6$ .................................................. I04B 35/56
[52] U.S. Cl. ................................. 428/336; 360/122; 501/87; 428/212; 428/698; 428/701; 428/702
[58] Field of Search ..................... 360/122; 501/87; 428/212, 701, 702, 698, 336

[56] References Cited

U.S. PATENT DOCUMENTS

| | | | |
|---|---|---|---|
| 4,251,841 | 2/1981 | Jacobs | 360/122 |
| 4,356,272 | 10/1982 | Kanemitsu et al. | 501/87 |
| 4,582,812 | 4/1986 | Furukawa et al. | 501/87 |
| 4,598,052 | 7/1986 | Wada et al. | 501/87 |
| 4,650,774 | 3/1987 | Kawaguchi et al. | 501/87 |
| 4,659,606 | 4/1987 | Wada et al. | 428/141 |
| 4,681,813 | 7/1987 | Yamada et al. | 428/698 |
| 4,745,091 | 5/1988 | Landingham | 501/87 |
| 4,818,608 | 4/1989 | Furuyama | 428/327 |
| 4,902,651 | 2/1990 | Wada et al. | 501/87 |
| 5,017,524 | 5/1991 | Moskowitz et al. | 501/87 |

FOREIGN PATENT DOCUMENTS 61-158862 9/1986 Japan .

OTHER PUBLICATIONS

English Abstract of J01111771–Apr. 28, 1989.
English Abstract of J01219059–Feb. 29, 1988.
English Abstract of J01249652–Mar. 30, 1988.
English Abstract of J57205369–Oct. 28, 1985.
English Abstract of J58001854–Jan. 07, 1983.
English Abstract of J60050903–Mar. 22, 1985.
English Abstract of J60059713–Apr. 6, 1985.
English Abstract of J60059714–Apr. 6, 1985.
English Abstract of J60059715–Apr. 6, 1985.
English Abstract of J60059716–Apr. 6, 1985.
English Abstract of J60059717–Apr. 6, 1985.
English Abstract of J60059718–Apr. 6, 1985.
English Abstract of J60066402–Apr. 16, 1985.
English Abstract of J60231308–Nov. 16, 1985.
English Abstract of J61227964–Oct. 11, 1986.
English Abstract of J63170258–Jul. 14, 1988.
English Abstract of J63170259–Jul. 14, 1988.
English Abstract of J63208208–Aug. 29, 1988.
English Abstract of J63278312–Nov. 16, 1988.
English Abstract of J85048470–Oct. 28, 1985.
English Abstract of J88023642–May 17, 1988.

*Primary Examiner*—A. A. Turner
*Attorney, Agent, or Firm*—Gary L. Griswold; Walter N. Kirn; Gregory D. Allen

[57] ABSTRACT

An electrically non-conductive $Al_2O_3$—TiC thin film computer head substrate, exhibiting improved edge retention during precision machining, is formed from a mixture of $Al_2O_3$ and TiC, where the TiC content in the final microstructure is less than about 18 weight percent and which is produced from TiC having a surface to volume mean diameter of about 2–10 micrometers. A thin film computer head substrate made from such a material, and sliders incorporating the substrate, exhibit significantly improved surface stability and diceability due to the exclusion of third-phase thermally-elastically mismatched dispersoids.

3 Claims, 3 Drawing Sheets

Fig. 5

NON-CONDUCTIVE ALUMINUM OXIDE-TITANIUM CARBIDE (Al2O3-TIC) THIN FILM COMPUTER HEAD SUBSTRATE, METHOD OF MAKING SAME, AND SLIDER ELEMENT INCORPORATING SAME

This is a continuation of application Ser. No. 07/783,835, filed Oct. 29, 1991, now abandoned.

FIELD OF THE INVENTION

This invention relates to a non-electrically conductive two-phase system of alumina ($Al_2O_3$) and TiC (TIC), and method of making same, which exhibits improved diceability and edge retention during machining.

DESCRIPTION OF RELATED ART

In the application of materials science to engineer end-use products such as cutting tools, nozzle inserts, magnetic recording tape head guides, and other structural components where erosive and frictional wear may be service limiting, physical properties such as material strength, wear resistance, surface stability, and electrical non-conductivity are often important performance requirements. One such materials/product performance interface is in the area of thin film computer head substrates used in the manufacture of "slider" elements which move at high velocities just above magnetic recording media. The following discussion relates to use of $Al_2O_3$—TiC (alutic) compositions useful as thin film computer head substrates, but it should be appreciated that other uses of these materials are contemplated where the above physical properties are critical.

Thin film computer head production begins with the application of magnetic transducer circuitry on a suitable non-magnetic substrate material through a combination of thin film sputter deposition, vapor deposition, and photolithography. Each standard slider element requires about 10 square mm of substrate surface area and therefore several hundred individual head circuits can be simultaneously applied to a monolithic substrate wafer. Micro and sub-micro sliders are substantially smaller and up to several thousand can therefore be applied to a single wafer. A successful high-yield deposition requires that the underlying substrate surface be almost perfectly flat and that it be virtually free of surface defects from the preceding machining and polishing operations. Once the transducers are formed on the substrate wafer, the wafer is cut into the individual slider elements. At this point, much time and effort has been exerted. High yields are necessary to support the expense.

It is helpful to digress at this point to explain terms used in the art in order to discuss the state of the art. Sectioning of individual slider elements from a fully processed wafer is accomplished through a precision "dicing" operation. In the art of producing very thin film computer head substrates from a single wafer, the term "diceability" can be taken to be synonymous with the terms "edge retention" and "edge stability". These terms refer to the degree of edge damage, or more exactly, to the degree of damage to the corners of the new edges formed when a wafer is processed through cutting, lapping, and polishing operations into a plurality of final slider elements. In this context, "damage" refers to the undesired and non-uniform removal of material from the edge corners, that is, the formation of edge defects called "chips". Chips that extend further than about 24 micrometers into the edge corner begin to reduce the ultimate slider element yield from the parent substrate wafer, resulting in increased processing costs per slider element. The terms "polishability" and "surface stability" are synonymous and both refer indirectly to the frequency of surface imperfections remaining on the parent substrate wafer surface or on the final slider element surfaces after the respective polishing and lapping operations. Surface defects larger than about 3 micrometers in diameter, even at relatively low frequency, or a higher frequency of surface voids less than about 3 micrometers in diameter, both limit wafer processing efficiency and therefore increase production costs. The term "grain size" may refer to the average size of the single crystal grains that comprise the polycrystalline substrate matrix or may refer specifically to the size of the $Al_2O_3$ grains, to the size of the TiC grains and/or to the size of third phase crystalline grains that may be in the $Al_2O_3$—TiC matrix. A "machineability" agent is typically an inorganic component added to the basic $Al_2O_3$ and TiC components in the microstructure to increase the cutting and lapping rates during the first stages of head fabrication when relatively greater amounts of substrate stock must be removed prior to the final stage of precision machining. Machineability agents can increase cutting and lapping rates either by lowering the bonding strength between the $Al_2O_3$ and TiC components in the densified alutic microstructure through grain boundary reaction involving one or both alutic components and the machinability agent, or by simply forming a significantly softer third phase, again through reaction with one or both alutic components. If the machineability agent shows little tendency to react with alutic components during consolidation and instead resides in the alutic matrix as discrete third phase grains or particles (dispersoids), and if the resulting dispersoids exhibit significantly different thermal and-/or elastic properties with respect to the surrounding alutic matrix phase, increased stock removal rates will also occur because of the high frequency of dispersoid grain pull-out. A "grain growth inhibitor" is typically an inorganic additive which in very minor amounts serves to inhibit the microstructural coarsening, which tends to occur in any ceramic powder compact during sintering densification at elevated temperatures.

Stainless steel was one of the first substrate materials used for thin film computer heads. Various non-magnetic ceramic systems followed, such as that described by U.S. Pat. No. 4,251,841, which discloses a system consisting of a two-phase alutic microstructure wherein the minor, and therefore discontinuous, TiC phase particles are distributed in the major continuous $Al_2O_3$ phase. This alutic system appeared to be ideal for the thin film computer head substrate application because while the material was extremely hard and wear resistant, it was also relatively easily machined and polished. U.S. Pat. No. 4,251,841 discloses an alutic substrate composition in which the TiC level ranges from 20 to 40 weight percent and in which the average grain size in the densified alutic microstructure is less than 5 micrometers, preferably in the 1 to 2 micrometer size range, due in part to the use of a grain growth inhibitor.

Subsequent alutic compositions such as disclosed in U.S. Pat. Nos. 4,582,812 and 4,681,813, for example, claimed that substrate performance with respect to machineability and diceability could be further improved by incorporating minor amounts of machineability agents and/or grain growth inhibitors to the alutic components prior to consolidation (densification). The introduction of these third-phase thermally-elastically mismatched dispersoids into the alutic matrix can improve machineability somewhat, but at the expense of surface stability (measured in terms of the amount of light scattered from substrate surfaces after the substrate surface is carefully polished to a relatively surface defect-free condition and then contacted with relatively coarse abrasive media).

Research and development conducted at Minnesota Mining and Manufacturing Company, Inc., St. Paul, Minn., has shown that substrate performance, both in the preparatory machining and polishing steps and in the final slider element, is a composite and complicated function of mechanical strength, diceability, edge stability, machineability, polishability, and surface stability. Minnesota Mining and Manufacturing Company, Inc., assignee of the present application, has produced and marketed two electrically conductive alutic compositions. These products are currently sold under the trade names "3M-210" and "3M-204-H", both of which are composed of $Al_2O_3$ and about 30 weight percent TiC. Both products have an average $Al_2O_3$/TiC grain size of about 1.2 micrometer, are electrically conductive, and show improved surface stability, tensile strength, and diceability over competing fine grain alutics. There has been no suggestion that coarser grain alutics, with no grain growth inhibitors, can provide improved diceability, surface stability, and tensile strength while remaining electrically non-conductive.

Thin film magnetic head circuitry must ultimately be deposited on an electrically non-conductive surface (typically electrical insulation of the head circuitry from the alutic substrate surface is achieved by first sputter depositing onto the substrate surface a base layer of non-conductive $Al_2O_3$ with an intrinsic volume resistivity of greater than about $10^{12}$ ohm-cm). Commercially available alutic compositions (such as disclosed in U.S. Pat. No. 4,251,841) are composed of about 70 weight percent $Al_2O_3$ and about 30 weight percent TiC, and are therefore electrically conductive. Therefore, an unmet need exists in the industry for an electrically non-conductive alutic substrate.

The following references represent the state of the art in thin film computer head substrate materials, and evidence a great deal of experimentation by way of third phase additives. Following each Japanese reference is its publication date in parentheses (month/date/year). U.S. Pat. No. 4,681,813 discloses the use of carbides of Zr, Hf, V, Mb, Ta, Cr, Mo, W and nitrides of Ti, Zr, Hf, V, Mb, Ta; Japanese publication J60050903 (Mar. 22, 1995) discloses the addition of Si, Fe, Cr, W; borides of Ti, Zr, Hf, Mb, Ta, V; carbides of Zr, Hf, Mb, Ta, Cr, Mo, W; nitrides of Ti, Zr, Hf, V, Mb, Ta; and oxides of Zr, Mg, Ca, and Y; Japanese publication J60059713 (Apr. 6, 1985) discloses Si and $Si_3N_4$; Japanese publication J60059713 (Apr. 4, 1985) discloses Si, B, and/or C; Japanese publications J60066402 (Apr. 16, 1985) and J88023642 (Apr. 16, 1985) disclose additions of Si, Fe, Cr, W, carbides and nitrides of Zr, Hf, V, Mb, Ta, Cr, Mo, W, Ti, and oxides of Zr, Mg, Ca, and Y; Japanese publications J60059718 (Apr. 6, 1985) and J60059716 (Apr. 6, 1985) additions of Si, C; Japanese publications J60059715 (Apr. 6, 1985) and J60059714 (Apr. 6, 1985), disclose additions of Si and $B_4C$; Japanese publication J63208208 (Aug. 29, 1988) discloses addition of Zr, $O_2$, Si, C, Mo, $SiO_2$, $ZrB_2$, $B_4C$, BN, and/or C; Japanese publication J63278312 (Nov. 11, 1988) discloses addition of oxides of Y and/or Zr; Japanese publications J57205369 (Dec. 16, 1982) and J85048470 (Oct. 28, 1985) disclose adding Zro; U.S. Pat. No. 4,818,608 discloses adding SiC, $Fe_2O_3$, $Cr_2O_3$; Japanese publications J61227964 (Oct. 11, 1986), J01249652 (Oct. 4, 1989), J01219059 (Sep. 1, 1989), and J01111771 (Apr. 4, 1989) disclose various oxides of Zr, Mg, Y, and Ca; Japanese publication J63134562 (Jun. 7, 1988) discloses additions of $ZrO_2$, AlN, oxides of Mg, Ca, B, Ni, Cr; Japanese publication J63100054 (May 2, 1988) discloses addition of $ZrO_2$, $Y_2O_3$, AlN; U.S. Pat. No. 4,582,812 discloses additions of oxides of Mg, Ni, Cr, Zr, and Y; Japanese publication J58001854 (Jan. 7, 1983) discloses addition of $Fe_2O_3$, CaO, MgO, $Y_2O_3$, and/or $ZrO_2$; U.S. Pat. No. 4,598,052 discloses addition of oxides of Mg, Mn, Ni, Co, Zr, and Y; Japanese publications J63170258 (Jul. 14, 1988) and J63170259 (Jul. 14, 1988) disclose the addition of $ZrO_2$; and Japanese publication J63170257 (Jul. 14, 1988) discloses the addition of SiC.

Representative alutic materials which disclose no third phase addition but which remain electrically conductive include those disclosed in Japanese publications J61227964 (Oct. 11, 1986), J60231308 (Nov. 16, 1985), and J62059566 (Mar. 16, 1987).

SUMMARY OF THE INVENTION

In accordance with the present invention an alutic material suitable for use as a thin film computer head substrate is presented having a lower percentage of TiC and a larger grain size of $Al_2O_3$ than conventional alutic substrates. The novel substrate is electrically non-conductive because of the reduced TiC content and exhibits superior surface stability during precision machining and lapping and during service because of the absence of third-phase thermally-elastically mismatched dispersoid machinability agents. The compositions exhibit reduced chip frequency relative to previously known compositions, translating into significantly higher slider element per wafer yield rates and lower production costs.

The present invention provides an electrically non-conductive $Al_2O_3$—TiC composition consisting essentially of a TiC phase and an $Al_2O_3$ phase. The TiC phase preferably comprises no more than about 18 weight percent of the composition, and more preferably ranges from about 5 to 18 weight percent. The $Al_2O_3$ phase comprises the balance of the composition and preferably has an average grain size in the final microstructure of at least about 1.1 micrometer, more preferably at least about 1.5 micrometer. The invention also provides an improved $Al_2O_3$—TiC thin film computer head substrate consisting essentially of a TiC phase and a $Al_2O_3$ phase, wherein the improvement comprises the substrate being electrically non-conductive.

Since the composition is electrically non-conductive, the invention also provides novel methods of fabricating the material and slider elements incorporating the material. The method of making a slider element substantially reduces the required thickness or eliminates the necessity of an intermediate step of depositing an electrically non-conductive base layer between the substrate and the magnetic head circuitry. Therefore, the intermediate fabrication step of depositing the base layer between the substrate and the magnetic head circuitry can either be significantly shortened (time and effort) or eliminated.

The invention thus provides a method of fabricating an electrically non-conductive $Al_2O_3$—TiC composition, the method comprising combining TiC having a surface to volume mean diameter ranging from about 2 to about 10 micrometers, more preferably from about 5 to about 9 micrometers, with $Al_2O_3$ to form an $Al_2O_3$—TiC mixture. The mixture is then subjected to powder consolidation operations selected from the group consisting of hot pressing, hot pressing followed by hot isostatic pressing, or pressureless sintering followed by isostatic pressing.

The method of making a slider element useful as a read/write computer head includes the steps of
 a) depositing a magnetic transducer on an $Al_2O_3$—TiC substrate, said substrate having a TiC phase which is less than about 18 weight percent of said substrate; and
 b) machining the substrate into a slider element.

Preferred are those methods wherein the TiC phase is produced by selecting a TiC powder having a surface to volume mean diameter ranging from about 2 to about 10 micrometers.

The final aspect of the invention is a slider element incorporating the above described substrate composition. Presented is a slider element comprising an electrically non-conductive substrate and a magnetic transducer deposited on at least a portion of the substrate, the substrate consisting essentially of a TiC phase and a $Al_2O_3$ phase. Preferred are those slider elements wherein the TiC phase comprises no more than about 18 weight percent of the substrate and the $Al_2O_3$ phase comprises the balance of the composition.

Further aspects of the invention will become apparent from the drawings, examples, and description which follows.

DETAILED DESCRIPTION OF THE INVENTION

The electrically non-conductive $Al_2O_3$—TiC (alutic) compositions of the present invention address both the electrical conductivity and the chipping frequency of substrates made therefrom. As used herein, the term "electrically non-conductive" means a volume resistivity of more than about $10^7$ ohm-cm. During lapping, machining, and polishing operations, as well as in actual use conditions, it is apparent that slider elements made using alutic compositions typically include slotted and angular features. These features are subject to chipping, breakage, and other deleterious effects. At best this can limit the yield of sliders, adding to production cost, and at worst can result in destruction of data recorded on magnetic media.

To minimize these problems, the invention provides a non-electrically conductive substrate consisting essentially of a two-phase system of $Al_2O_3$ and TiC, and method of making the same. The compositions exhibit improved diceability and edge retention during machining, the compositions being electrically non-conductive because of the reduced TiC content. Quite unexpectedly, the compositions are more chip resistant due indirectly to the starting TiC particle size, as more fully explained below.

The compositions, desired grain size distribution, and microstructural uniformity of the final substrate composition are dependent on the processing conditions used to make the compositions. The two basic process steps for preparation of the alutic substrate compositions are "powder processing" and "powder consolidation". As more fully explained below, ideally the powder processing step is merely a selecting step. If the ideal particle size distribution of the TiC and $Al_2O_3$ are not on hand, powder processing embraces mixing and milling operations to deagglomerate the as-received $Al_2O_3$ powder, comminute (pulverize) the as-received TiC powder, and to provide a final uniform binary co-dispersion of the two powders.

Powder consolidation can include one of the number of thermally activated densification processes. The processes operate on the uniform powder co-dispersion from the powder processing step to yield a strong, hard, and theoretically dense substrate exhibiting the desired grain size distribution and microstructural uniformity. Although the following describes the preparation of a wafer from which thousands of slider elements may be produced, the powder processing and consolidation procedures may be used to form other structural components where erosive and frictional wear may be service limiting.

PROCESSING PRINCIPLES

The composition, grain size distribution, and microstructural uniformity of the final composition are very dependent on the process procedure. The procedure for making the compositions of this invention includes two important steps:
 1. Powder processing (or selection)
 2. Powder consolidation The physical and chemical characteristics of the starting TiC powder component, and to a lesser extent those of the starting alumina component, are important determinants of the microstructural characteristics and physical properties of the final composition.

The particle size distribution of the starting TiC powder is preferably narrowly centered around an average particle size ranging from about 2 to 10 micrometers, more preferably from 5 to 9 micrometers. As used herein, "average particle size" refers to surface to volume mean diameter wherein a volume measurement is divided by a surface area measurement to arrive at a diameter. In other words, the preferred TiC particle size distribution is one in which the frequency of TiC particles having diameter less than about 2 micrometers or greater than about 10 micrometers should be as low as possible.

The purity of the starting TiC powder is not known to be a critical determinant of any of the microstructural features or physical properties of the composition, so long as the composition is electrically non-conductive. The preferred starting TiC powder has a free carbon content less than about 0.3 weight percent and nitrogen (N) and oxygen (O) contents less than about 0.5 and 1, respectively. It is speculated that greater amounts of these interfere with the oxycarbide bonding reaction occurring at the $Al_2O_3$/TiC interface during powder consolidation. It is also preferred that the total weight percent sum of the transition and refractory metals V, Ni, Fe, Co, Mo, Nb, and W not be greater than about 2. These elements are believed to be the result of wear of the metal processing equipment used to produce the TiC powder; ideally, of course, there would be none of these elements present. The TiC powder such as described above can be obtained from a number of commercial suppliers of laboratory and production quantities of non-oxide powders. The TiC powder sold under the trade name "MP-55" available from Kennametal, Inc., Latrobe, Pa., satisfies the above size and purity preferences.

The particle size distribution of the starting alumina powder is a less critical determinant of the microstructural features and physical properties of the substrate invention than is the particle size distribution of the starting TiC powder. The particle size distribution of the starting alumina powder can be more extended toward both the fine and coarse particle sizes but the preferred particle size distribution should be centered around an average particle size of about 1 micrometer. The particle size distribution of the starting alumina powder can also be characterized in terms of the powder's specific surface area. The preferred surface area for the starting alumina powder ranges from about 6 to about 12 square meters per gram of powder.

As was the case for the starting TiC powder, the purity level of the starting alumina powder is not known to be a critical determinant of final composition properties. It is preferred that the starting alumina powder exhibit a total purity level not less than about 99.5%. Alumina powder, as described above, can be obtained from a number of commercial suppliers of laboratory and production quantities of oxide powders. The alumina powder sold under the trade name "RC-152" from Reynolds Metal Company, Alumina Research Division, Bauxite, Ark., is an example of an alumina powder that satisfies the size and purity preferences.

Powder processing procedure following powder selection can be adjusted as necessary depending on the physical characteristics (particle size distribution, surface area, etc.) of the starting alumina and TiC powders to obtain the desired final composition microstructure. The desired end-point after powder processing is a uniform and intimate co-dispersion of the properly sized alumina and TiC powder components prior to densification.

The particle size distribution of the starting TiC powder can be further limited as necessary in its dispersion about the desired 2 to 10 micrometers average particle size through standard practice powder processing techniques such as jet milling, ball milling, and/or air-classification. The particle size distribution of the starting alumina powder can also be adjusted using the same powder processing techniques.

The final intimate and uniform co-dispersion of the properly sized alumina and TiC powders is easily accomplished by first creating an intimate co-dispersion or co-suspension of the powders in a liquid suspending medium according to standard practice in the wet mixing and comminution of ceramic powders. A list of preferred liquid suspending media includes water, ethanol, methanol, isopropanol, and odorless mineral spirits (OMS). Depending on the surface chemistry and condition of the starting powders, an organic dispersant, surfactant, or wetting agent may be necessary to obtain a stable and intimately mixed suspension of the alumina and TiC powder components in the liquid medium. Since the powder mixture is typically subjected to subsequent mechanical forming procedures such as uniaxial cold pressing, isostatic cold pressing, extrusion, injection molding, etc., a suitable organic binder-lubricant may also be incorporated into the liquid co-dispersion or co-suspension of powder components.

Once the intimate co-dispersion or co-suspension of properly sized alumina and TiC powders is obtained, the liquid-powder mixture is dried and the desired "green" (unfired or undensified) substrate preform is fabricated. The green substrate preform can be created through a number of different standard practice compaction techniques as indicated above but fabrication of the relatively simple preform geometries (flat discs and squares) preferably employs only uniaxial cold pressing and/or isostatic cold pressing.

Because the TiC phase is discontinuous and because it is relatively unreactive with the continuous alumina matrix phase, the final TiC grain size distribution in the final composition microstructure is dictated largely by the starting TiC particle size distribution. The alumina grain size distribution in the final composition microstructure, in contrast, is dependent in part on the TiC grain size distribution and in part on the powder consolidation to which the green substrate preform is finally subjected.

The three important consolidation conditions are atmosphere, time, and temperature. Consolidation of the substrate powder co-dispersion is preferably conducted in a substantially inert or reducing atmosphere to prevent excessive oxidation of the TiC particles. Argon, nitrogen, or various mixtures of argon, nitrogen, and hydrogen are possible consolidation atmospheres. The alumina grain size distribution in the final composition microstructure is principally affected by temperature. The consolidation temperature required to obtain the preferred average alumina grain size of about 1.5 micrometer in the final composition microstructure depends in turn on the consolidation technique and, as described above, on the starting TiC grain size distribution. For example, if the powder mixture is consolidated through hot pressing where an uniaxial pressure between about 10 and 70 megapascals is applied to the powder during sintering, a temperature between about 1700° C. and 1800° C. for about 15 minutes can result in full theoretical density with the desired alumina grain size distribution. If the substrate preform is pressureless sintered, a consolidation temperature between about 1750° C. to 1850° C. for 1 to 2 hours will usually yield greater than about 95 percent of full density with a somewhat coarser alumina grain size distribution centered on an average alumina grain size of about 1.5 to 1.7 micrometer.

Independent of consolidation technique, higher consolidation temperatures are required to reach the desired final alumina grain size distribution as the starting TiC particle size distribution is shifted toward smaller average TiC particle sizes. A "finer" starting TiC particle size distribution contains a larger number of small TiC particles which can more effectively immobilize the alumina grain boundaries during densification than would be the case for a smaller number of larger TiC particles from a "coarser" starting TiC particle size distribution. A reduced alumina grain boundary mobility during densification results in a finer alumina grain size distribution in the final densified composition microstructure. If the starting TiC particle size distribution is too fine, a satisfactorily coarsened alumina grain size distribution is difficult to achieve, irrespective of consolidation technique and temperature.

Both hot pressing and pressureless sintering can consolidate the starting alumina TiC powder co-dispersion to theoretical density if the consolidation time is long enough and/or if the consolidation temperature is high enough. If the chosen consolidation time-temperature interval results in a density that is less than theoretical density but greater than about 94 percent of theoretical density, then theoretical density can still be achieved through a densification technique known as hot isostatic pressing (HIP). In HIP'ing, a high isostatic pressure is transmitted to the part through liquid argon at elevated temperatures and the elimination of residual porosity left over from the final stages of densification (from hot pressing or pressureless sintering) is more effectively achieved. A HIP temperature of about 1650° C. to 1750° C. accompanied by a HIP pressure of about 100 to 300 megapascals for about 2 hours is sufficient to fully densify partially densified (greater than about 94 percent of theoretical) parts from hot pressing or pressureless sintering.

The fully densified substrate preforms from hot pressing or pressureless sintering can then be shaped into the desired substrate geometry according to a wide variety of standard practice rough grinding and fine polishing procedures.

The resulting composition and microstructure comprises a TiC phase and an $Al_2O_3$ phase, the TiC phase preferably comprising no more than about 18 weight percent, more preferably ranging from about 5 to 18 weight percent of the composition, the balance being the $Al_2O_3$ phase. The $Al_2O_3$ grain sizes are more easily measured than the TiC grains. $Al_2O_3$ average grain size of at least about 1.1 micrometer, more preferably at least about 1.5 micrometer, is preferred. Exemplary compositions are those having low TiC weight percent and coarse $Al_2O_3$ grains, i.e., those compositions having over 1.5 micrometer $Al_2O_3$ grains and having no more than 18 weight percent TiC, and further being free from third-phase dispersoids.

It will be appreciated by those skilled in the art that additives that do not form third-phase dispersoids are typically added to the powders during powder processing and powder consolidation, some of which have already been mentioned, supra, as dispersants and binder-lubricants. Other additives commonly used are inorganic in nature, including $TiO_2$ (titanium dioxide), MgO (magnesium oxide), $SiO_2$ (silicon dioxide), and $Y_2O_3$ (yttrium oxide), all of which do not form third-phase dispersoids, but which either react with the $Al_2O_3$ or dissolve in the TiC phase. For example, the titanium dioxide, to an unknown extent during sintering, partially enters into a compound reaction with the $Al_2O_3$ phase and/or is in part or completely reduced to titanium monoxide (TiO), which is 100 percent mutually soluble in the TiC phase. The net effect is an apparent improvement in $Al_2O_3$—TiC grain boundary "stability" which may in turn result in some improvement in polishability. Magnesium oxide serves as an $Al_2O_3$ grain growth inhibitor during consolidation and may be used to more precisely achieve a reproducible microstructure. Silicon dioxide and yttrium dioxide are sometimes included during sintering as sintering aids. What is important for the purposes of the present invention, and in contrast to previously known compositions, is that none of the organic or inorganic additives evolve into third-phase dispersoids. While some manufacturing benefits, such as somewhat higher lapping rates during rough grindings, are achieved with machinability agents, the degraded surface stability during the final polishing and finishing steps exhibited by such compositions inevitably leads to higher costs overall or may limit performance during service.

Articles of manufacture incorporating the compositions of the present invention include thin film computer head substrates and slider elements of the type disclosed in U.S. Pat. No. 4,251,841, incorporated herein by reference as far it is necessary to understand the structure disclosed therein. Thin film computer head substrates therein disclosed typically include a body having an air-bearing surface or surfaces, leading and trailing ends relative to motion of a data tract, and at least one thin film transducer attached to the body.

An especially attractive feature of the present inventive compositions is the ability to fabricate a thin film computer head substrate and transducer combination (i.e., a slider element) without (or substantially reducing) the step of depositing an intermediate layer of insulating material between the transducer and substrate, since the substrate in this instance is already electrically non-conductive. To fabricate such a slider element, one simply follows the powder processing and consolidating steps as described herein to form a substrate wafer; followed by depositing the magnetic or other transducer via vapor deposition/photolithography operations onto the substrate. The vapor deposition/photolithography steps are well-known to skilled artisans. The substrate wafer is then diced and the individual elements machined into the desired shape and form of slider elements. In previously known methods of producing slider elements, an insulating base composition layer, such as $Al_2O_3$ having a thickness of about 10 micrometers, is applied to the substrate prior to deposition of the transducer. The compositions described herein allow elimination of this layer; of course, a residual layer of $Al_2O_3$ may be applied to ensure insulation.

The invention is further illustrated by the following non-limiting examples, wherein all particle and grain sizes are in micrometers.

EXAMPLES

FABRICATION EXAMPLES A–E

Five test substrates A–E (Table 1) were prepared to examine the effect of TiC weight percent (loading) and particle size distribution on diceability and electrical conductivity. Test substrate preparation was in accord with the general process principles outlined in the previous section. Detailed test substrate preparation is outlined below.

Alumina and TiC powder co-dispersions A–E were prepared separately though powder-liquid suspension ball milling in a 1 liter high-alumina ball mill manufactured by Norton Company, Akron, Ohio, sold under the trade name "774 Roalox". The alumina powder in each example A–E was supplied by Reynolds Metals Company, Bauxite, Ariz., under the trade name "RC-152" and had an average particle size of 0.65 micrometer. The TiC powder used in each example A–E was supplied by Kennametal, Inc., Latrobe, Pa., sold under the trade name "MP55". In each example, the mill was loaded to 35 volume percent of its total mill capacity (35 volume percent of 1 liter) with a powder-liquid suspension containing about 52 volume percent powder (52 volume percent of the total powder-liquid volume). The suspending liquid was odorless mineral spirits (OMS) with a specific gravity of 0.762 at 16° C. and was supplied under the trade name "Soltrol 130" by Phillips Petroleum Company, Borger, Tex.

In each powder-OMS suspension, 0.85 weight percent dispersant based on the total powder weight was dissolved into the OMS to promote wetting of the powder by the OMS and thereby maximize powder loading in the OMS (52 volume percent). The dispersant was a cationic pigment wetting agent and was supplied under the trade name "Duomeen TDO" from Armak, Industrial Chemical Division, Chicago, Ill. The mixing and milling in each 1 liter mill was accomplished with about 3900 grams (3 grams media per cubic centimeter of total mill capacity) of 6.35 millimeter cylindrical radius-end cobalt-bonded tungsten carbide milling media supplied by Kennametal, Latrobe, Pa. Each test mill was rotated at about 90 revolution per minute for the duration of each mixing milling operation.

Examples A, B, and C were prepared with TiC powder designated as lot number 870 from Kennametal, each having a surface to volume mean diameter of 1.7 micrometer and a volume mode diameter of 3.2 micrometers as determined by a particle size measuring device manufactured under the trade name "Coulter Cohnter" by Coulter Electronics, Inc., Hialeah, Fla. The mill rotation time for Example A was 12 hours and was 10 hours for Examples B and C. Examples D and E were prepared from TiC powder designated as lot number 198 from Kennametal, each having a starting surface to volume mean particle diameter of 2.1 micrometers and a volume mode diameter of 4.0 micrometers as determined by the particle size analysis device known as "Coulter Counter." Before use in Examples D and E, the lot 198 TiC powder was air-classified to obtain a coarser particle size distribution with a surface to volume mean diameter of 6.8 micrometers and a volume mode diameter of 7.1 micrometers. The rotation time for Example D and E was only 7 hours to ensure that the coarser starting TiC particle size distribution was not excessively comminuted.

After mill rotation, the powder-OMS co-dispersion from each Example was wet screened through a 325 mesh standard sieve (45 micrometer square openings), vacuum dried at about 300° C. for about 16 hours and then screened through a 60 mesh standard sieve (250 micrometer square openings). All Examples A–E were hot pressed at 1650° C. and 14 megapascals uniaxial pressure for 15 minutes into 5.08 cm diameter by 0.635 cm thick discs using a non-commercial hot press furnace with a graphite heating element and hydraulic loading rams. All test wafers A–E were then HIP'ed to full density at 1700° C. and about 140 megapascals isostatic pressure for 2 hours in a commercial laboratory hot isostatic furnace manufactured by Conway Pressure System, Inc., available under the trade name "MiniHIP".

Each test wafer A–E was then rough ground and lapped to a final thickness of about 0.406 cm using 100 micrometer diamond and 30 micrometer cubic boron nitride abrasive media. The rough grinding and lapping was done on automated grinding and lapping equipment commonly used in the machining of hard ceramic components. Following the automated 30 micrometer lapping operation, each test wafer A–E was then hand polished through 9, 3, and 0.5 micrometer diamond abrasive media on diamond coated lapping film supplied under the tradename "Imperial Diamond" manufactured by Minnesota Mining and Manufacturing Company, St. Paul, Minn.

TESTING EXAMPLES

The following Test Examples 1–4 describe how adjustment of the amount and initial particle size of TiC results in reduced chip frequency in the finished wafer substrates of Examples A–E during machining and lapping operations. Example A is a comparative example, designed to represent "standard" wafer compositions.

Table 1 gives the composition, average starting TiC particle size and average final grain size for 5 hot pressed and HIP'ed alutic wafers (Examples A–E). All test wafers were prepared as described, supra. Average grain sizes were obtained through standard line-intercept metallography on thermally etched and polished surfaces.

TABLE 1

| | Composition and Average Particle and Grain Sizes of 5 Alutic Substrate Wafers | | | | | |
|---|---|---|---|---|---|---|
| Substrate Wafer | TiC % Loading | | TiC Particle Size | | Average Grain Size | Average Grain Size |
| | (Vol.) | (Wt.) | (Mode) | (Mean) | TiC | $Al_2O_3$ |
| A | 25.6 | 30.0 | 3.2 | 1.7 | 0.82 | 0.86 |
| B | 15.0 | 18.0 | 3.2 | 1.7 | 0.94 | 1.12 |
| C | 10.0 | 12.2 | 3.2 | 1.7 | 0.96 | 1.20 |
| D | 15.0 | 18.0 | 7.1 | 6.8 | 1.27 | 1.52 |
| E | 10.0 | 12.2 | 7.1 | 6.8 | 1.12 | 1.67 |

One-to-One Comparative Dicing Procedure for Examples 1–4

3,175 $cm^2$ flats were cut from opposite sides of wafers A–E and the desired dicing mount was configured by abutting flats from two wafers (e.g. A and B) and waxing the two flats onto a steel plate. In each Test Example 1–4 the steel plate was then magnetically chucked into a precision wafering machine fitted with a bonded abrasive wheel. A precision wafer machine designed as model number "WMSA-2231" available from Micromech Manufacturing Company, Union, N.J., fitted with a resin bonded diamond abrasive wheel specified as "3D76-R75-B12" (available from Industrial Tools Inc., of Ojai, Calif., having dimensions of 12.70 cm outside diameter and 0.071 cm thickness was used. Each two-wafer mount was cycled at least once at 4500 rpm at 0.254 cm depth, and at 1.27 cm per minute feed rate with a forward climb cut (wheel turning downward into material) followed by a non-climb cut (wheel turning upward out of material) at the same depth and feed rate. The resulting kerf edges were traversed at 400× with a microscope (sold under the trade name "Optiphot," from Nikon) and chip sizes down to 16 micrometers (into material and away from kerf edge) were automatically tabulated from a video monitor output.

Chip-Response and Conductivity for Examples 1–4

Chip response was most meaningfully correlated with average $Al_2O_3$ grain size, as opposed to average TiC grain size because the $Al_2O_3$ grain morphology in the final two-phase microstructure was more uniformly discerned than that of the discontinuous TiC phase.

The higher volume resistivities (lower electrical conductivities) were determined from the direct measurement of current and potential using guard electrodes on one side of the wafer. In the lower volume resistivity range, a constant current potential drop was measured across a test sample of known length and crosssectional area.

TEST

EXAMPLE 1

Figure 1:
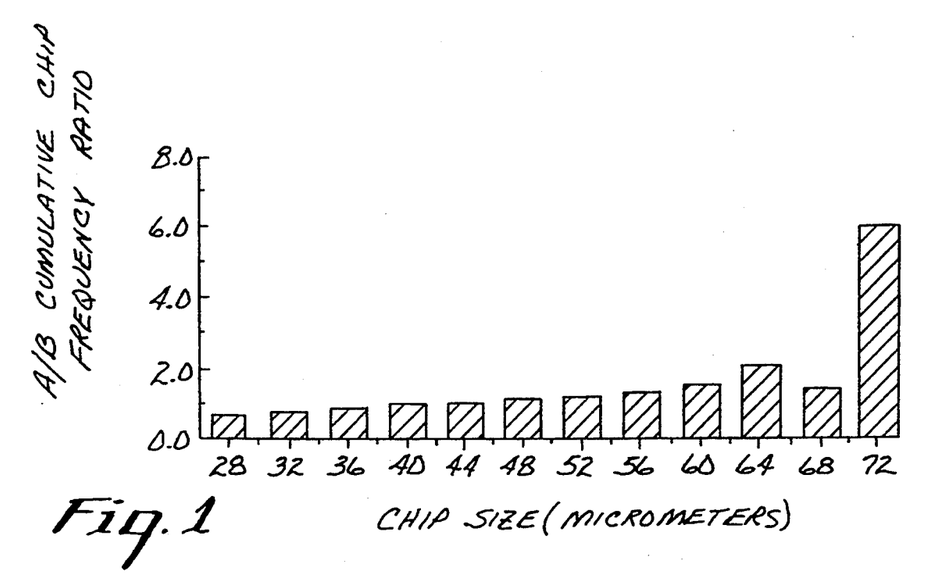
FIG. 1 shows cumulative chip frequency ratio from substrate (A) response divided by substrate (B) response. Substrate (A) and substrate (B) contained 30.0 and 18.0 weight percent 3.2 micrometer starting TiC particle size, respectively.

Test substrate wafers A and B of Table 1 were evaluated in a one-on-one comparative dicing test according to the procedure described above and the relative response for each is represented in form of cumulative chip frequency ratios as shown in FIG. 1. FIG. 1 shows, for example, that test substrate wafer A, having 30 weight percent TiC had about 1.1 times more chips less than or equal to 48 micrometers, and about 6 times more chips less than or equal to 72 micrometers, than did test substrate wafer B having 18 weight percent TiC. Expressed in practical production terms, the measurably lower cumulative chip frequency distribution exhibited by substrate B at 18 weight percent TiC translates into better edge dicing and polishing operations performed on the final slider element. Better edge retention translates into a higher slider element per wafer yield and lower total head manufacturing costs. Test substrate wafer A had a volume resistivity of about 0.002 ohm-cm and test substrate B was electrically non-conductive.

TEST

EXAMPLE 2

Figure 2:
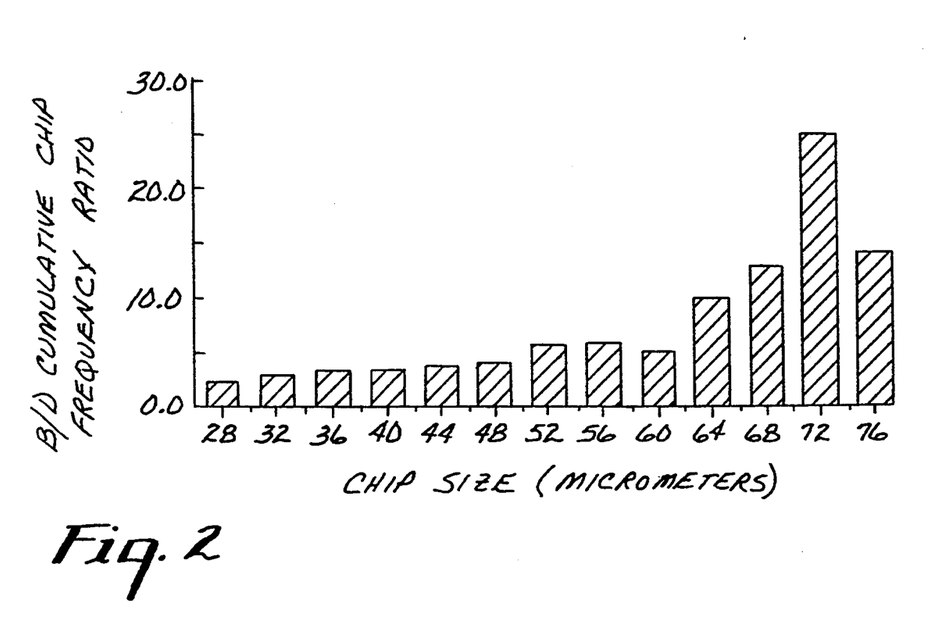
FIG. 2 represents cumulative chip frequency ratio from substrate (B) response divided by substrate (D) response. Substrate (B) and (D) contained 18.0 weight percent and 15.0 weight percent 3.2 and 7.1 micrometer starting TiC particle size, respectively.

Test substrate wafers B and D were evaluated as described in Example 1, yielding the results shown in FIG. 2. FIG. 2 shows that test substrate D, having 18 weight percent of TiC made from 6.8 micrometer mean diameter TiC powder, had ¼ of the number of chips less than or equal to 48 micrometers, and less than 1/10 of the number of chips less than or equal to 72 micrometers, compared with test substrate wafer B having 18 weight percent TiC made from 1.7 micrometer mean diameter TiC powder. Both substrates were electrically non-conductive.

TEST

EXAMPLE 3

Figure 3:
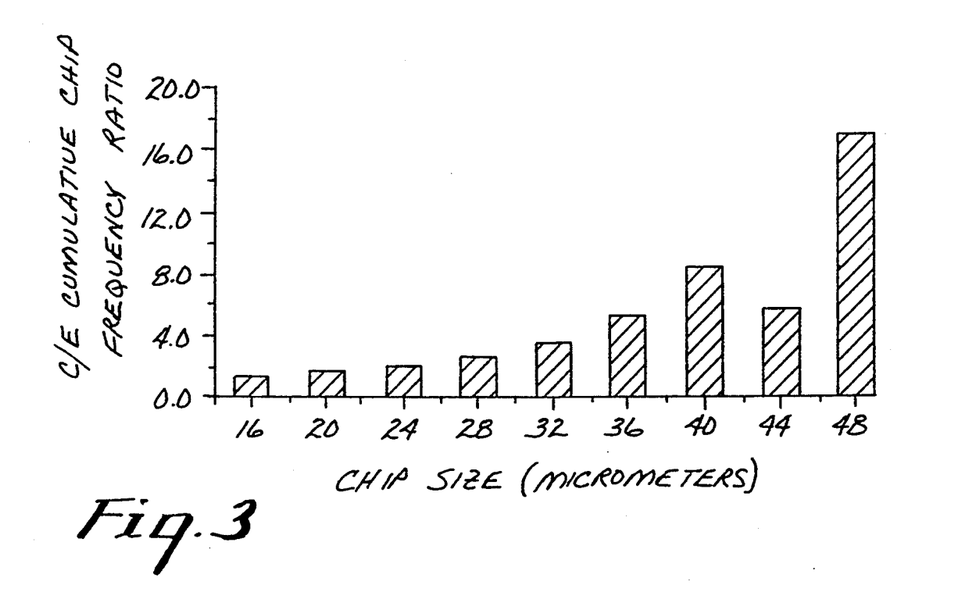
FIG. 3 represents cumulative chip frequency ratio from substrate (C) response divided by substrate (E) response. Substrates (C) and (E) contained 12.2 weight percent 3.2 and 7.1 micrometer starting TiC particle size, respectively.

Test substrate wafers C and E were evaluated as in Examples 1–2, the results indicated in FIG. 3. FIG. 3 shows the same effect at 12.2 weight percent TiC that was obtained in Example B at 18 weight percent TiC, that is, the more coarsely grained test substrate yielded a superior dicing response. Both substrates C and E were electrically non-conductive.

TEST

EXAMPLE 4

Figure 4:
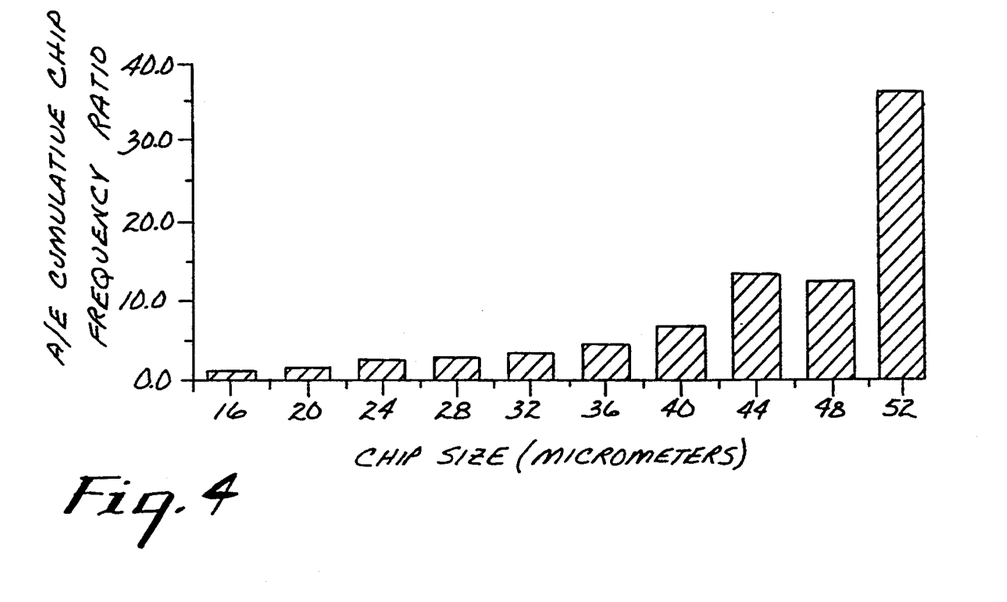
FIG. 4 represents cumulative frequency chip frequency ratio from substrate (A) response divided by substrate (E) response.

Test substrate wafers A and E were evaluated as in the previous examples, results represented in FIG. 4. FIG. 4 represents a one-on-one comparison of the test substrate wafer composed for best dicing performance (substrate wafer E) with that of a commercially available substrate wafer with respect to TiC weight percent and grain size (substrate A). FIG. 4 exhibits the unexpected result that test substrate wafer E, at 12.2 weight percent TiC made from 6.8 micrometer mean diameter TiC powder, exhibited significantly superior edge retention compared with the substrate of Example A at 30 weight percent TiC made from 1.7 micrometer mean diameter TiC powder. As previously stated, substrate wafer A was electrically conductive with a volume resistivity of about 0.002 ohm-cm and substrate wafer E was non-conductive, with a volume resistivity greater than about $10^7$ ohm-cm.

Figure 5:
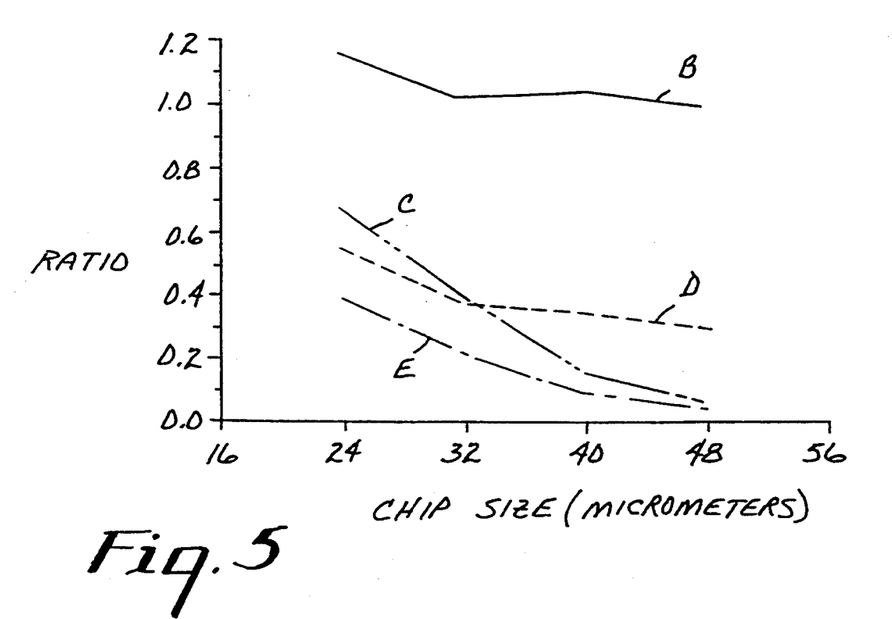
FIG. 5 represents cumulative chip frequency ratios obtained by dividing the average response of each of the experimental substrates by the average response of substrate (A).

The four sets of cumulative chip frequency distribution ratios given in the above four Test Examples provide one-on-one comparative evidence that significant improvement in diceability can be obtained through a reduction in TiC loading and through an increase in starting TiC particle size. The separate and combined effects of changing the two variables of TiC loading and grain size can be further resolved by combining the two separate dicing measurements obtained for substrate wafers A, B, and E, respectively, into an average response yielding a single comparative response for each of the five substrates A–E as shown in FIG. 5.

The cumulative chip frequency distribution ratios as shown in FIG. 5 again show that edge retention is significantly improved by reducing the volume percent of TiC or by increasing the TiC starting particle size. The cumulative chip frequency distribution ratios of FIG. 5 show that, surprisingly, the greatest improvement in edge retention is obtained when the weight percent of TiC is reduced to about 12 weight percent, and the TiC average starting particle size is increased to about 6.8 micrometers mean diameter, yielding the greatest increase in average $Al_2O_3$ grain size.

Although this invention has been described using certain illustrative examples, it should be understood that the invention is not limited to the specific exemplary embodiments described in the specification. For example, differing initial particle sizes and/or amounts of TiC may be advantageous in certain applications to achieve the desired composition and microstructure for the particular application.

What is claimed is:

1. A slider element useful as a read/write computer head which includes a body having an air-bearing surface and leading and trailing ends relative to motion of a data tract, the body comprising an electrically non-conductive substrate having a volume resistivity of more than about $10^7$ ohm-cm and a magnetic transducer deposited on at least a portion of said substrate, said substrate consisting essentially of a TiC phase and an $Al_2O_3$ phase, said substrate being absent of third-phase thermally-elastically mismatched dispersoid machinability agents, wherein said TiC phase comprises no more than about 18 weight percent of the substrate, and wherein the $Al_2O_3$ phase has an average grain size of at least 1.5 micrometer.

2. A slider element in accordance with claim 1 which further comprises an insulating base composition layer between said substrate and said transducer, said base composition layer having a thickness less than about 10 micrometers, said base composition layer having an intrinsic volume resistivity of greater than about $10^{12}$ ohm-cm.

3. A slider element useful as a read/write computer head which includes a body having an air-bearing surface and leading and trailing ends relative to motion of a data tract, the body comprising an electrically non-conductive substrate having a volume resistivity of more than about $10^7$ ohm-cm and a magnetic transducer deposited on at least a portion of said substrate, said substrate consisting essentially of a TiC phase and an $Al_2O_3$ phase, said substrate being absent of third-phase thermally-elastically mismatched dispersoid machinability agents, said substrate derived from combining no more than 18 weight percent TiC with $Al_2O_3$, said TiC having a surface to volume mean diameter ranging from about 2 to about 10 micrometers, wherein said TiC phase comprises no more than about 18 weight percent of the substrate, and wherein the $Al_2O_3$ phase has an average grain size of at least 1.5 micrometer.

* * * * *

UNITED STATES PATENT AND TRADEMARK OFFICE
CERTIFICATE OF CORRECTION

PATENT NO. : 5,413,850
DATED : May 9, 1995
INVENTOR(S) : Nehring

It is certified that error appears in the above-indentified patent and that said Letters Patent is hereby corrected as shown below:

On the title page, item [54], line 2 "(Al2O3-TIC)" should be --($Al_2O_3$-TiC)--.

Col. 1, line 2 of the title "( Al2O3-TIC)" should be --($Al_2O_3$-TiC)--.

Col. 1, line 14, "(TIC)," should be --(TiC),--.

Col. 11, line 41, "Cohnter" should be --Counter--.

Col. 14, line 14, "107" should be --$10^7$--.

Signed and Sealed this

Nineteenth Day of December, 1995

Attest:

BRUCE LEHMAN

Attesting Officer

Commissioner of Patents and Trademarks